May 15, 1934.  R. M. HEINTZ  1,958,753
STATIONARY ARMATURE CONSTRUCTION
Filed Dec. 9, 1932
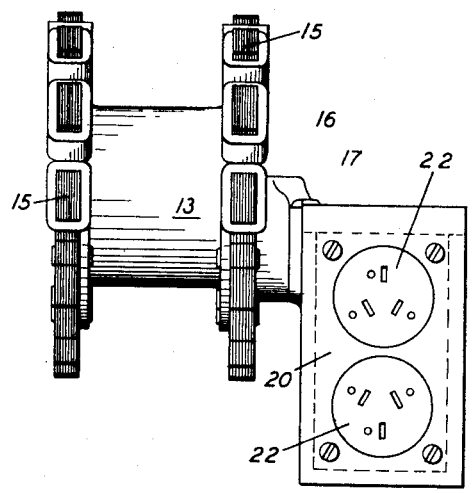
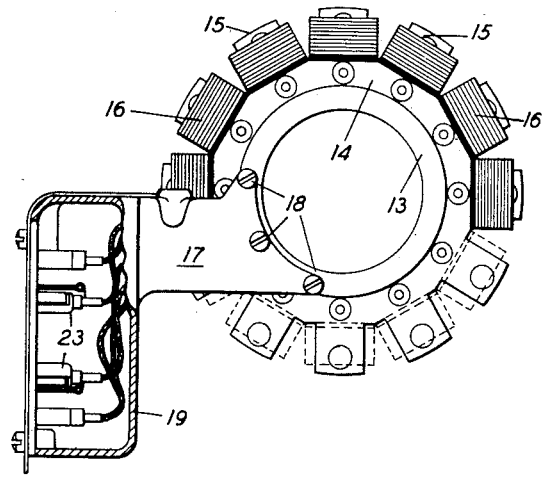
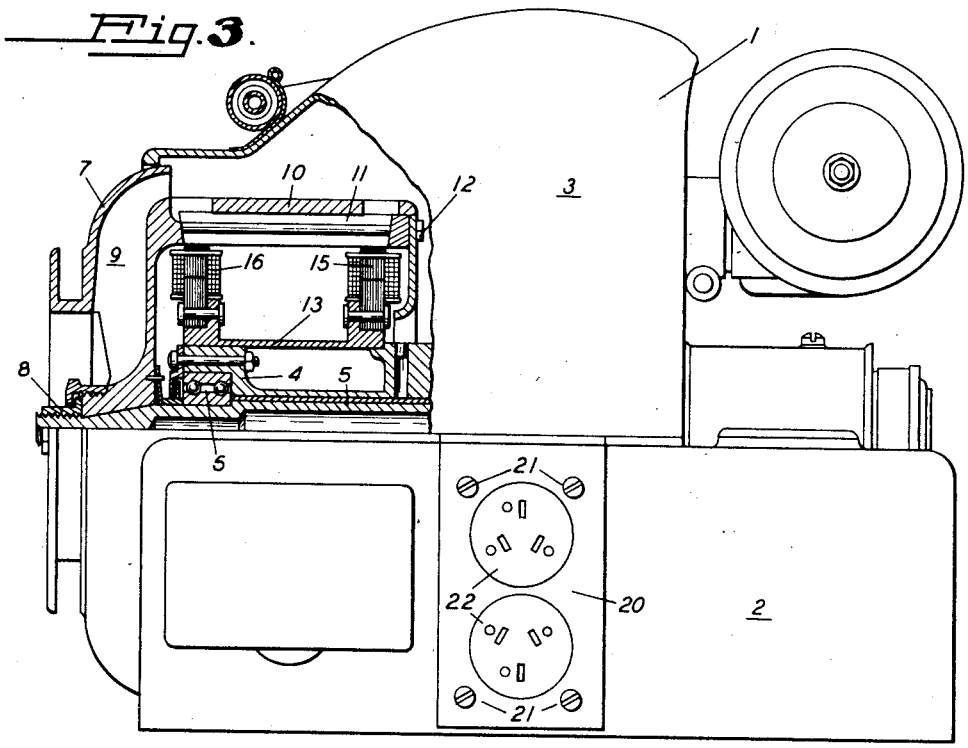
INVENTOR,
RALPH M. HEINTZ.
BY
ATTORNEY Patented May 15, 1934

1,958,753

UNITED STATES PATENT OFFICE 1,958,753

STATIONARY ARMATURE CONSTRUCTION

Ralph M. Heintz, Palo Alto, Calif., assignor to Heintz & Kaufman Ltd., San Francisco, Calif., a corporation of Nevada Application December 9, 1932, Serial No. 646,406

2 Claims. (Cl. 171—252)

My invention relates to a current generator, and more particularly to a generator having a stationary armature structure, including means for enclosing the lead wires carrying current generated in the armature coils.

Among the objects of my invention are:

To provide a simple and effective means for bringing out leads from a stationary armature.

To provide a conduit arm for a slidably mounted stationary armature through which the armature leads may be brought out.

To provide a conduit arm for the leads from a slidably mounted stationary armature, said conduit arm serving as positioning means to hold said armature in place.

To provide a structure comprising a stationary armature, pickup coils, outlet receptacle and lead conduit which may be removed from a generator as a unit.

Other objects of my invention will be apparent or will be specifically pointed out in the description forming a part of this specification, but I do not limit myself to the embodiment of my invention herein described, as various forms may be adopted within the scope of the claims.

In the drawing, which illustrates a preferred embodiment of my invention:

Figure 1 is a side view of a stationary armature, showing the attached conduit arm and outlet receptacle.

Figure 2 is an end view of the armature with part of the outlet box cut away to show the armature leads.

Figure 3 is a side view partly in elevation and partly in section of the armature structure in position in a generator direct coupled to a prime mover.

In small generating units, particularly in units which employ inductor alternators having a rotating permanent magnet field and a stationary armature, it is often necessary to dismount the generator, as in case where repairs are necessary. As small portable units, such as here to be described, are often used on exploratory expeditions far from shop facilities, it is of extreme importance that such alternators be dismountable with the minimum of tools, or nuts and bolts which may be easily lost.

In its broadest aspect my invention comprises a generator which has a stationary armature structure slidably mounted on a foundation, preferably an extension from a prime mover, said armature having extending therefrom a conduit arm enclosing all the armature leads and terminating in an outlet receptacle. This arm is also used to lock the armature in place by fitting into a well in the foundation, and during dismounting operations serves as a handle to enable the armature to be removed from the foundation without tools.

Referring to the drawing with first reference to Figure 3, a prime mover 1, preferably a gas engine of the proper power, is provided with a foundation casting 2, and an air hood 3. The single cylinder of this engine is under this hood and not shown.

A sleeve 4 projects from the prime mover, and encloses a drive shaft 5, the outer end of the shaft being positioned by a ball bearing 6. The end of the shaft projecting beyond the sleeve is tapered and carries a flywheel 7, held on by a lock nut 8. This flywheel is also a blower and discharges air into the air hood 3 through an air channel 9.

A flywheel extension frame 10 carries a plurality of permanent magnets 11 held in place by bolts 12, thus providing a rotating magnetic field.

Slidably mounted on the sleeve 4 is a stationary armature frame 13 carrying two sets of laminations 14 each having a plurality of pole extensions 15, on which are mounted armature coils 16.

The number of armature coils on each lamination ring is the same as the number of permanent magnets in the rotating field, and each ring is positioned so that the pole extensions from the laminations of each ring are closely adjacent the pole faces of the permanent magnets with a small air gap to allow for rotation of the field in service.

The armature coils are connected in series in groups or entire as desired, and the leads brought into a hollow conduit arm 17 attached at the rear of the frame by bolts 18 and extending laterally to terminate in an outlet receptacle box 19. A face plate 20 is held to the box by screws 21, and carries outlet receptacles 22 to the contacts 23 of which the armature leads are attached.

A well or depression is formed in the foundation casting in which the arm 17 and box 19 fit, leaving the face plate flush with the side of the casting.

The air hood 3 then fits over the arm and prevents the arm from leaving the well.

In the dismounting operation, the air hood 3 is removed, and the nut 8 is taken off the shaft. The arm 17 and box 19 are then rotated upwardly to clear the well and the arm is used as a handle to slide the armature off the sleeve, incidentally carrying the flywheel and field structure with it. In like manner, to replace the armature is slid on the sleeve by using the arm as a handle, carrying the field along with it, and when the armature is in place, the arm and box are rotated downwardly into the well, the air hood replaced, and the flywheel secured. The conduit thus acts as a means for dismounting the armature, locking device for the armature, and a conduit and outlet box for the armature leads.

I claim:

1. In combination, a driving unit, a shaft driven by said unit, a concentric sleeve extending from said unit and enclosing said shaft, a rotating field structure mounted on said shaft, a stationary armature structure slidably mounted on said sleeve, a hollow conduit arm fastened to said armature, an outlet receptacle on the end of said arm, wires connecting said outlet receptacle with said armature, and a well in said driving unit to receive said arm and receptacle, whereby said armature is prevented from sliding on said sleeve when said arm is in said well.

2. In combination, a driving unit, a shaft driven by said unit, a concentric sleeve extending from said unit and enclosing said shaft, a rotating field structure mounted on said shaft, a stationary armature structure slidably mounted on said sleeve, a hollow conduit arm fastened to said armature, an outlet receptacle on the end of said arm, wires connecting said outlet receptacle with said armature, a well in said driving unit to receive said arm and receptacle, whereby said armature is prevented from sliding on said sleeve when said arm is in said well, and means forming a part of said driving unit for retaining said arm in said well.

RALPH M. HEINTZ.